(12) United States Patent
Chou et al.

(10) Patent No.: US 7,224,592 B2
(45) Date of Patent: *May 29, 2007

(54) MULTI-PERIOD CYCLE-ALTERNATIVE SWITCHING MODE POWER SUPPLY CONTROL DEVICE AND ITS CONTROL METHOD

(75) Inventors: Chin-Wen Chou, Taipei Hsien (TW); Ying-Nan Cheng, Taipei Hsien (TW); Kuang-Ming Wu, Taipei Hsien (TW); Chin-Biau Chung, Taipei Hsien (TW)

(73) Assignee: Zippy Technology Corp., Taipei Hsein (TW)

( * ) Notice: Subject to any disclaimer, the term of this patent is extended or adjusted under 35 U.S.C. 154(b) by 308 days.

This patent is subject to a terminal disclaimer.

(21) Appl. No.: 10/984,940

(22) Filed: Nov. 10, 2004

(65) Prior Publication Data

US 2005/0062444 A1    Mar. 24, 2005

Related U.S. Application Data

(63) Continuation-in-part of application No. 10/359,128, filed on Feb. 6, 2003, now Pat. No. 6,839,253.

(51) Int. Cl.
*H02M 7/00* (2006.01)
(52) U.S. Cl. .......................................... 363/84; 363/95
(58) Field of Classification Search ................ 363/74, 363/78, 84, 85, 86, 87, 88, 89, 95, 96, 97, 363/98
See application file for complete search history.

(56) References Cited

U.S. PATENT DOCUMENTS

| | | | |
|---|---|---|---|
| 4,445,049 A | 4/1984 | Steigerwald | |
| 4,499,534 A | 2/1985 | Schnetzka et al. | |
| 4,591,963 A | 5/1986 | Retotar | |
| 4,642,745 A | 2/1987 | Steigerwald et al. | |
| 4,882,664 A | 11/1989 | Pennington | |
| 5,235,504 A | 8/1993 | Sood | |
| 5,477,132 A | 12/1995 | Canter et al. | |
| 6,151,226 A | 11/2000 | Chen et al. | |
| 6,307,765 B1 | 10/2001 | Choi | |
| 6,690,591 B2 | 2/2004 | Min | |
| 6,839,253 B2 * | 1/2005 | Chou et al. | 363/84 |

* cited by examiner

*Primary Examiner*—Jeffrey Sterrett
(74) *Attorney, Agent, or Firm*—Birch, Stewart, Kolasch & Birch, LLP (57) ABSTRACT

The present invention relates to a multi-period cycle-alternative switching mode power supply control device and its control method, and the device comprises: a power transfer control unit, a dimming bias control, a burst timing control, and a steering logic; and the method is a power control method that uses a burst timing control to produce an ON_OFF (High_Low) control timing, and after regulated power with a different amplitude is added to the OFF period of the burst period between two ON_OFF periods, two or more mixed periods are used to regulate the timing to a highly reliable and a broad dynamic range. The device of the invention can effectively control certain power transfer components of specific nature and assure that those components and the loading at the rear end can operate more efficiently in a reliable range of a specific nature.

16 Claims, 14 Drawing Sheets

MULTI-PERIOD CYCLE-ALTERNATIVE SWITCHING MODE POWER SUPPLY CONTROL DEVICE AND ITS CONTROL METHOD

This application is a continuation-in-part, and claims priority, of from U.S. patent application Ser. No. 10/359,128 filed on Feb. 6, 2003, now U.S. Pat. No. 6,839,253 entitled "Multi-period cycle-alternative switching mode power supply control device and its control method".

FIELD OF INVENTION

The present invention relates to a multi-period cycle-alternative switching mode power supply control device and its control method, more particularly to a power supply controller having a variable multi-period control cycle to effectively control certain power transfer components of specific nature and assure those components and the loading at the rear end can operate more efficiently in a reliable range of specific nature.

BACKGROUND OF THE INVENTION

Figure 6:
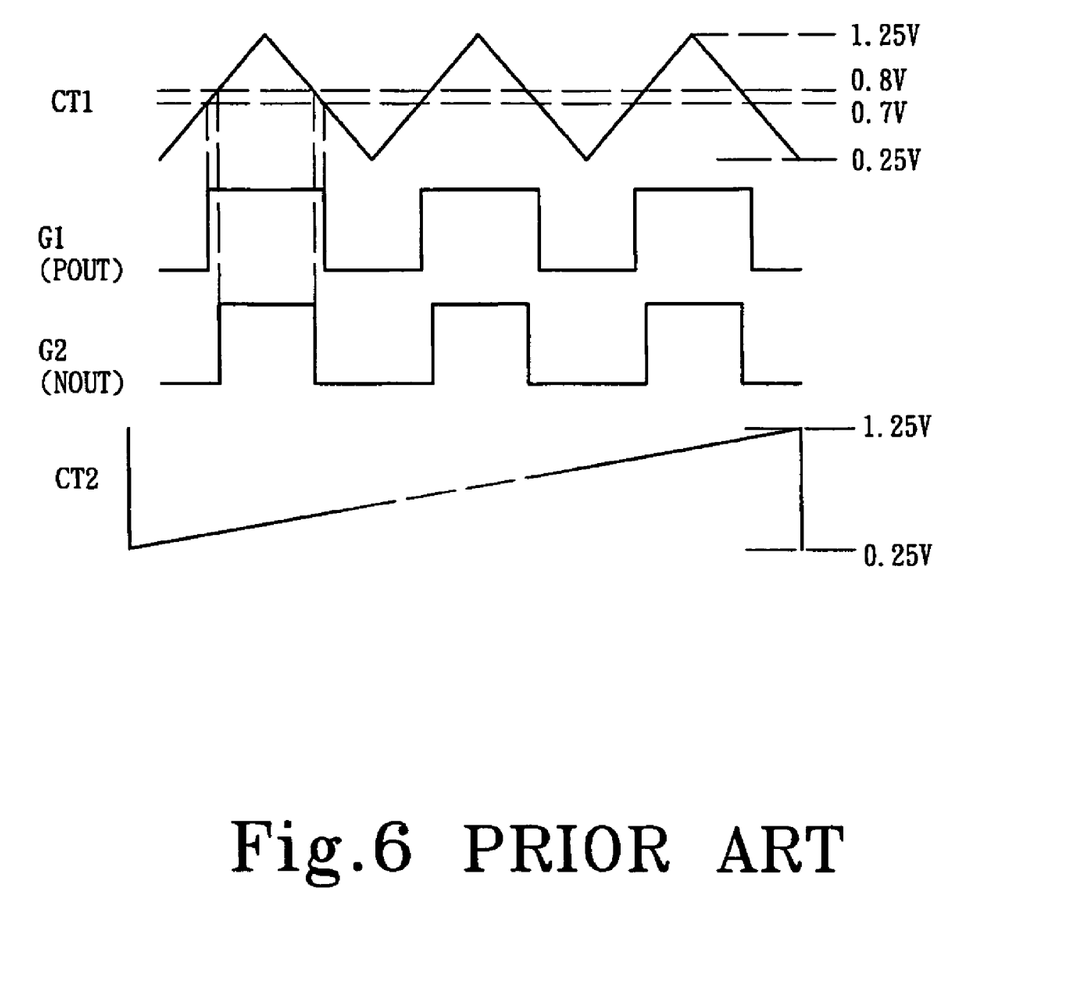
FIG. 6 is an illustrative diagram of the traditional regulated light timing waveform.

The prior-art switching power supply controller is a controller primarily using the normal rate and variable frequency for the control as shown in FIG. 6. The charge and discharge of electricity of each oscillated circuit are set by means of connecting the resistor to the RT terminal, of which the RT terminal is connected to the FB terminal through the resistor to provide (controlled by light) a control frequency. CT1 is connected to the output terminal of the oscillated circuit of a capacitor, and capable of generating a trigonometric wave oscillation between the lower limit LL and the upper limit UL by means of the current at RT terminal. CT2 is connected to the terminal of a capacitor to generate and provide a serrated wave to enable 1/20 of the current at the CR1 terminal to pass and produce serrated wave oscillations between the lower limit and upper limit. However, the method described above is not necessarily a good method for certain power transfer components, particularly to those power transfer components having the property of a bandpass filter; a change of the input frequency may result in a change of output voltage, but a great deal of input power is absorbed by such power transfer components. Therefore a long time use may break down such components or expedite their aging, and thus affecting the reliability of the whole system.

Figure 7A:
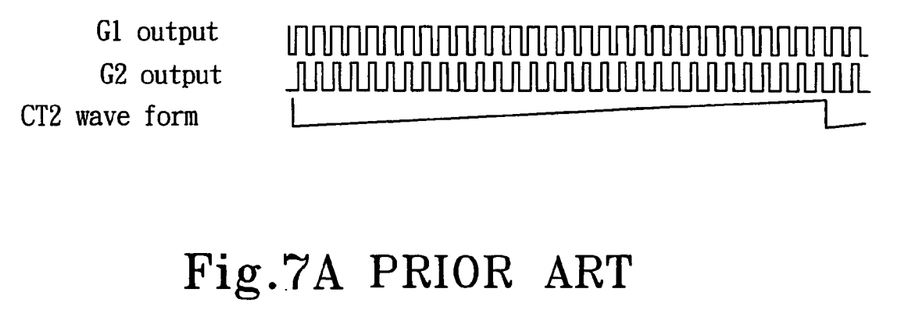
FIG. 7A is an illustrative diagram of the prior-art timing under the control of power intensity of 100% of the light source and a burst cycle of about 120 Hz per second.
Figure 7B:
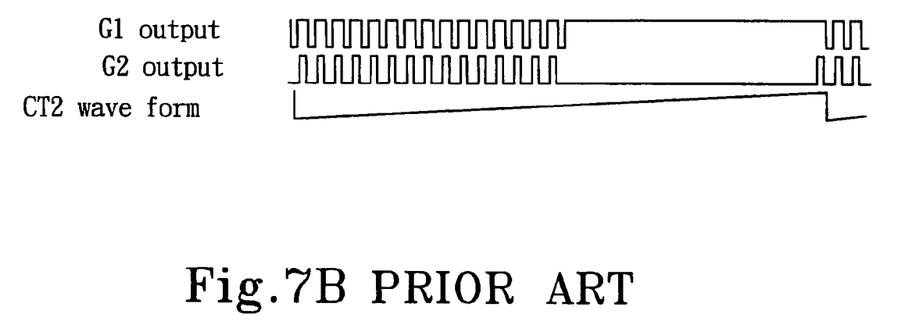
FIG. 7B is an illustrative diagram of the power transfer according to FIG. 7A while it is not operating, and in 50% of the total suspending state.
Figure 7C:
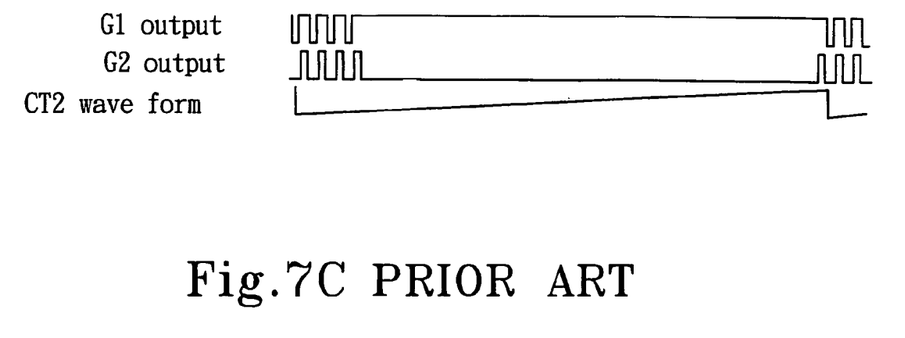
FIG. 7C is an illustrative diagram of 10% of the power transfer according to FIG. 7A while the power transfer component is not operating, and in 90% of the total suspending state.

Furthermore, if the output end requires a dimming, a burst timing circuit is generally used to intermittently transfer the output power (as shown in FIGS. 7A to 7C), and the power transfer component varies the power or voltage and sends the power to the loading component. However, such method has a substantial shortcoming, because the intermittent ON_OFF will transiently impact the power transfer component (from zero power to maximum power) and will also cause such component to produce audible noise.

SUMMARY OF THE INVENTION

The primary objective of the present invention is to overcome the shortcomings and avoid the deficiencies of the prior art by providing a standby mode function during the off cycle, which greatly improves the regulation control range of the original system, and maintains an overall action of the power transfer component. Therefore the audible noise can be suppressed. Each of the ON and OFF cycles provides different power transfer, and also effectively excites the loading terminal, so that the system performance of the power transfer component and the device at the loading terminal can be controlled effectively, and thus making the product more reliable and efficient.

To accomplish the aforementioned purpose, the multi-period alternative-cycle switching power supply control device of the present invention comprises a power transfer control, a dimming bias control, a burst timing control, and a steering logic; wherein said device has a variable multi-period control cycle to effectively control certain power transfer components of specific nature and assure those components and the loading at the rear end can operate more efficiently in a reliable range of specific nature.

Another objective of the present invention is to provide a new control method that uses a variable multi-period control cycle to effectively control certain power transfer components of specific nature and assure those components and the loading at the rear end can operate more efficiently in a reliable range of specific nature.

To accomplish the aforementioned purpose, the method disclosed in the invention is an energy control method that uses a burst timing control to produce an ON_OFF (High_Low) control timing, and after regulated energy with a different amplitude change is added to the OFF period of the burst period between two ON_Off cycles, two or more mixed cycles are used to regulate the timing to a highly reliable and broad dynamic range.

DETAILED DESCRIPTION OF THE PREFERRED EMBODIMENTS

To make it easier for our examiner to understand the objective of the invention, its structure, innovative features, and its performance, we use a preferred embodiment together with the attached drawings for the detailed description of the invention.

Figure 1:
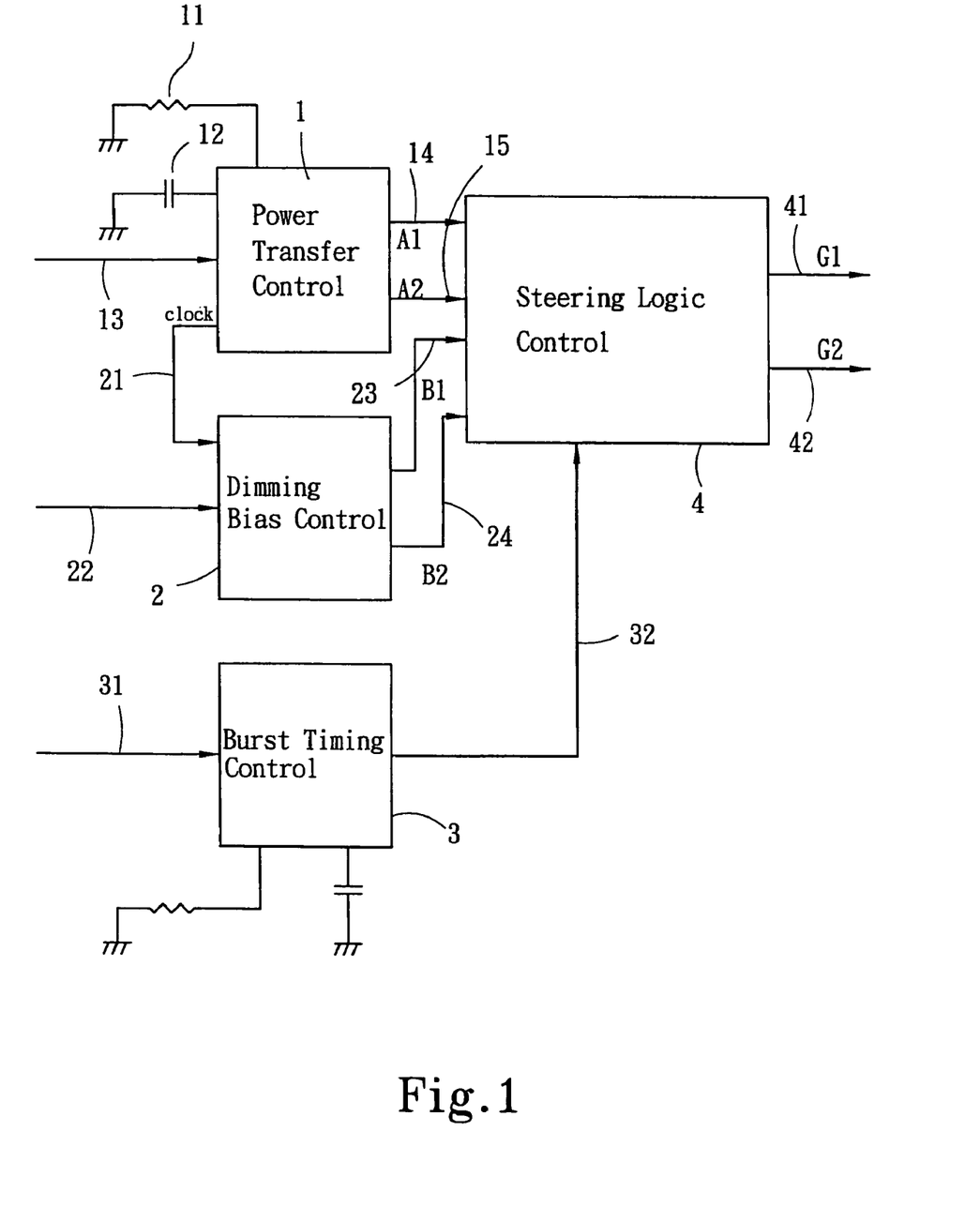
FIG. 1 is a block diagram of the present invention.

Please refer to FIG. 1 for the circuit functional block diagram of the present invention. In FIG. 1, the multi-period cycle-alternative switching mode power supply control device having a variable multi-period control cycle to effectively control certain power transfer components of specific nature and assure those components and the loading at the rear end can operate more efficiently in a reliable range of specific nature; said device comprises a power transfer control unit 1, a dimming bias control 2, a burst timing control 3, and a steering logic 4; wherein said power transfer control 1 is comprised of a resistor 11 and a capacitor 12 to constitute a determinant element for setting the operating frequency point, and the input terminal 13 of the power transfer control 1 inputs an error signal, and the feedback error signal is used to regulate the duty width, and further obtained the regulated signals A1, A2 at the output terminals 14, 15 of the power transfer control 1. The two control output signals with different timing relation are sent to the steering logic circuit 4.

One input end 21 of the dimming bias control 2 is connected to another output end of said power transfer control 1. The clock signal generated by the power transfer control 1 is used as a reference source, while another input terminal 22 of the dimming bias control 2 inputs an electric potential of an error signal to change the timing relation of the reference clock signal, and thus obtain another set of control timing B1, B2 with a standby mode. Said control timing B1, B2 is outputted from the output terminal 23, 24 of the dimming bias control 2 to said steering logic control 4.

The burst timing control 3 is comprised of a set of rising trigonometric wave circuits, while there is a dimming ADJ signal at the input terminal 31 for comparing with said rising trigonometric wave circuits, and further to obtain a ON_OFF (High_Low) control timing C1. Said control timing C1 is used to allocate said regulated signals A1, A2 and output the timing of the control timing B1, B2 to the timing relation of the output terminal 41, 42 of the steering logic control 4. In other words, the control timing C1 selects the regulated signals A1, A2 outputted by the power transfer control 1 or the control timing B1, B2 of the dimming bias control 2, and the steering logic control 4 outputs the signals from its output ends 41, 42.

Figure 2:
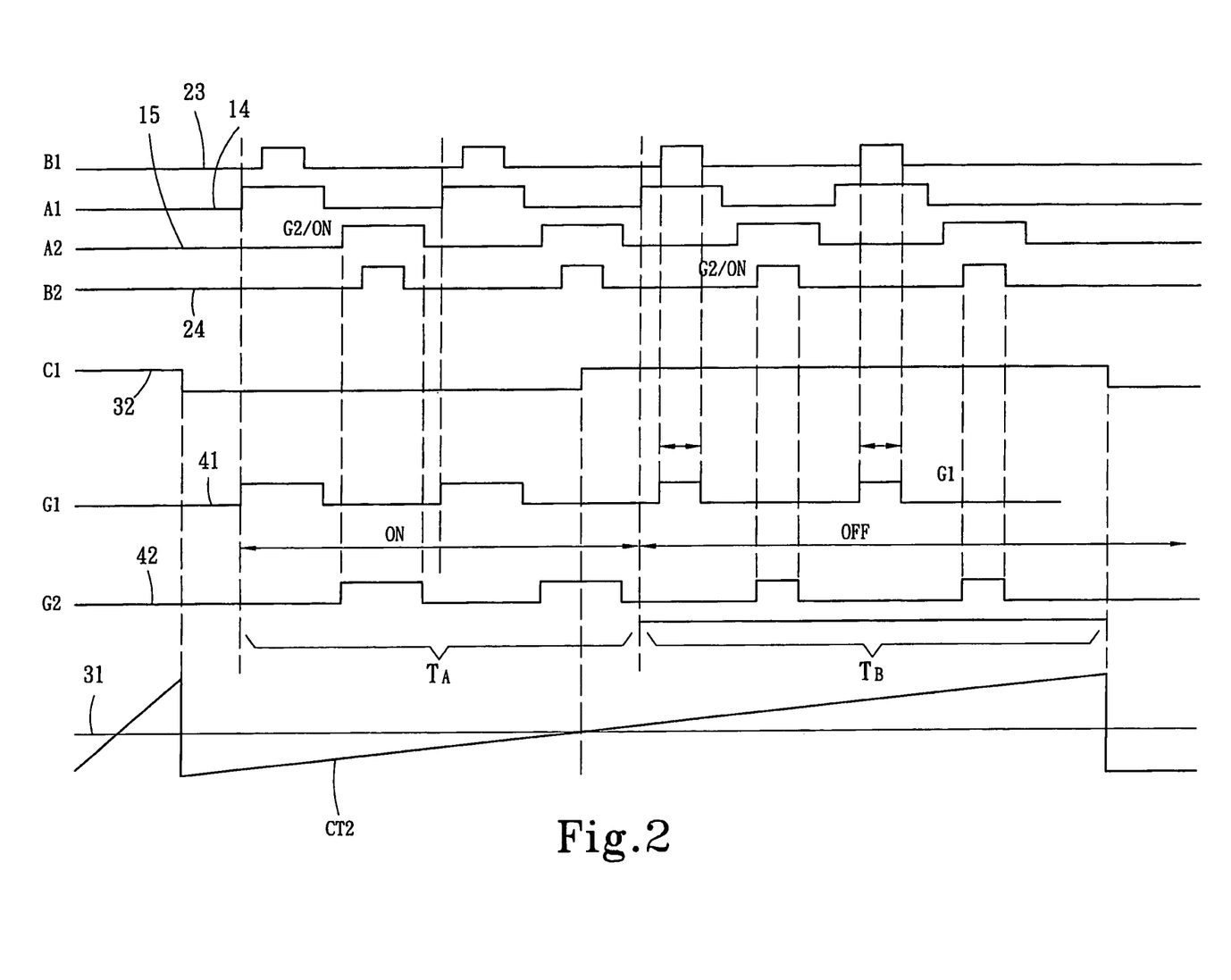
FIG. 2 is an illustrative diagram of timing waveform of FIG. 1.
Figure 3:
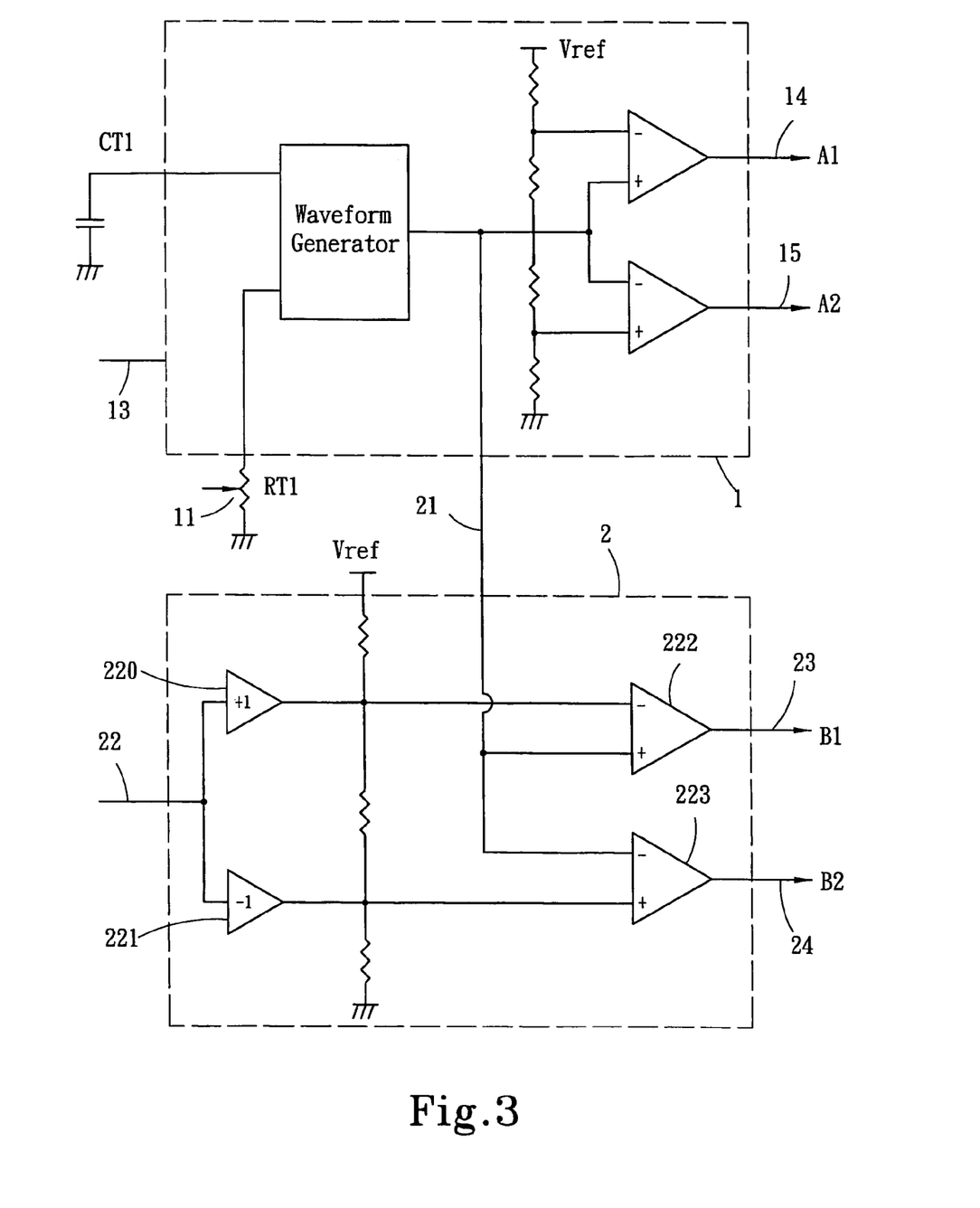
FIG. 3 is a schematic diagram of a power transfer control and dimming bias control circuits of the present invention.
Figure 4:
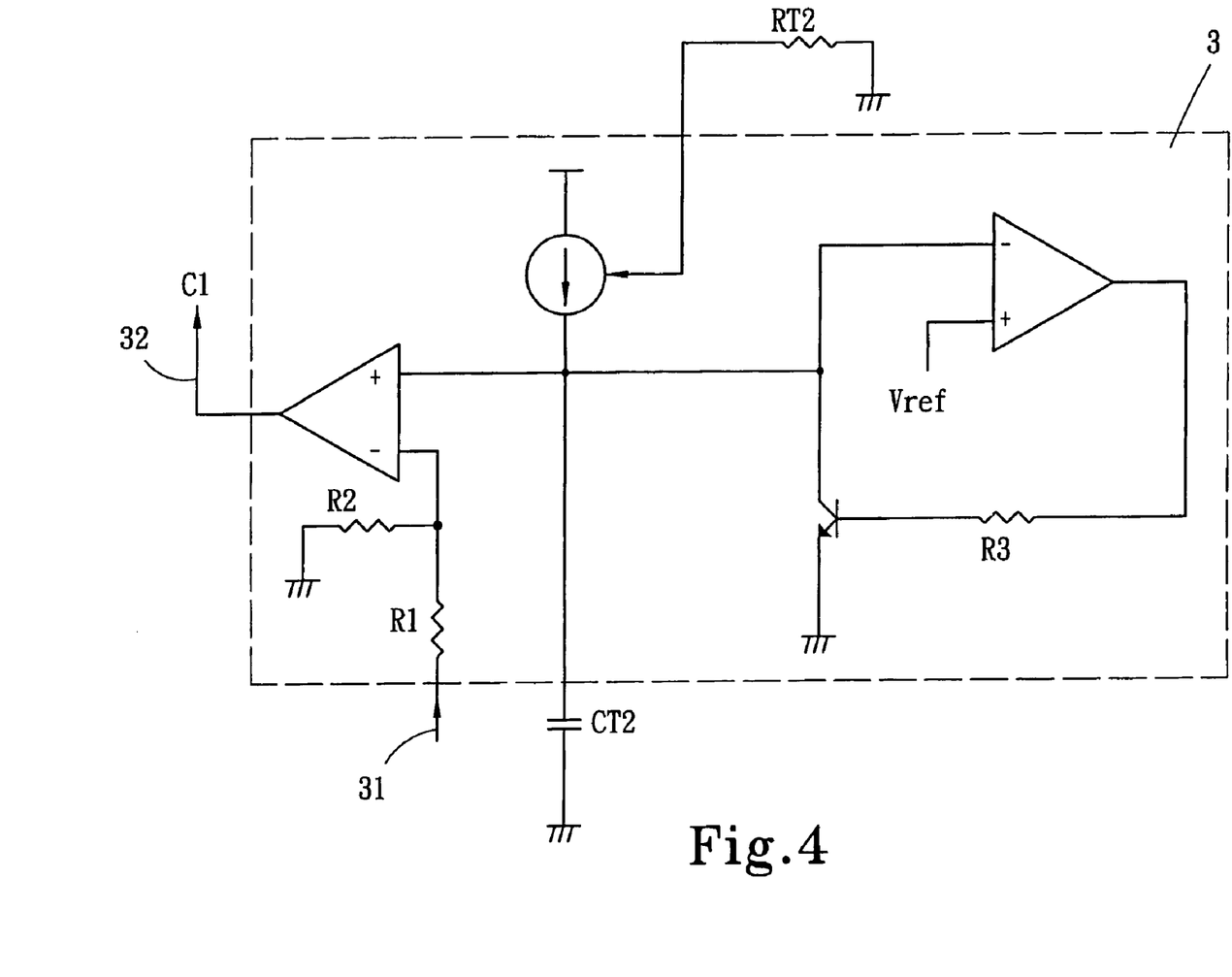
FIG. 4 is an illustrative diagram of a burst timing control circuit of FIG. 1.
Figure 5:
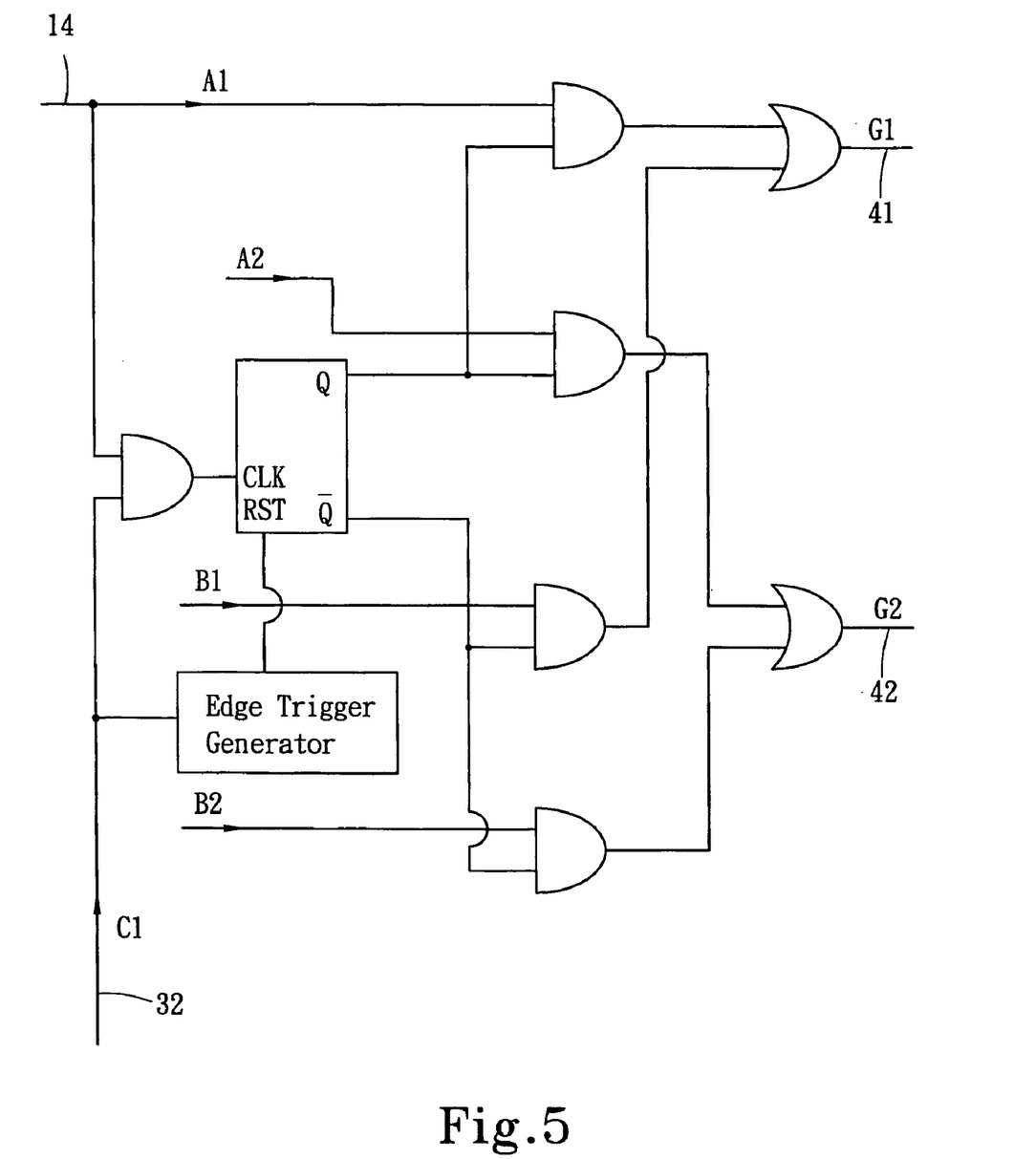
FIG. 5 is an illustrative diagram of a steering logic control circuit of FIG. 1.
Figure 8:
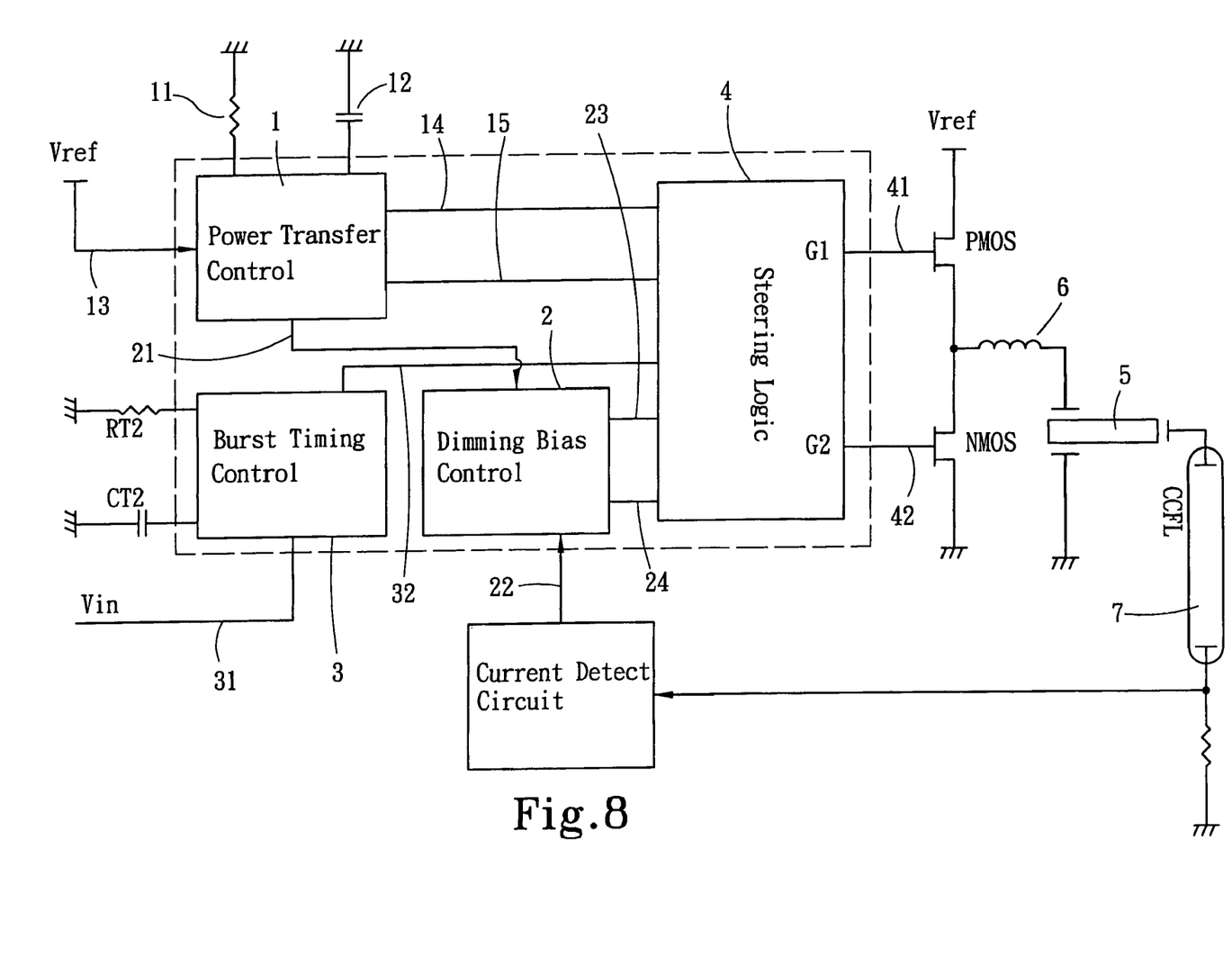
FIG. 8 is a circuit diagram of the switching power supply according to a preferred embodiment of the present invention

The steering logic control 4 as shown in FIG. 5 sends the regulated signal A1, A2 outputted from the power transfer control 1, the control timing B1, B2 outputted from the dimming bias control 2, and the timing C1 outputted by the burst timing control 3 in sequence to the ON_OFF signal at the output terminal 32 of the burst timing control 3, and is separated in different timing according to the sequence including an ON period (TA) and an OFF period (TB) and outputted from the output end 41, 42 of the steering logic control 4 as shown in FIG. 2, and thus controlling the external soft resonant components to perform an appropriate power waveform transfer, and sending the power waveform (close to the sine wave) to the power transfer component. The signal after the transfer (step-up or step-down signal) is sent to the component 7 at the loading end (such as a lamp or a rectification circuit) as shown in FIG. 8.

Figure 9A:
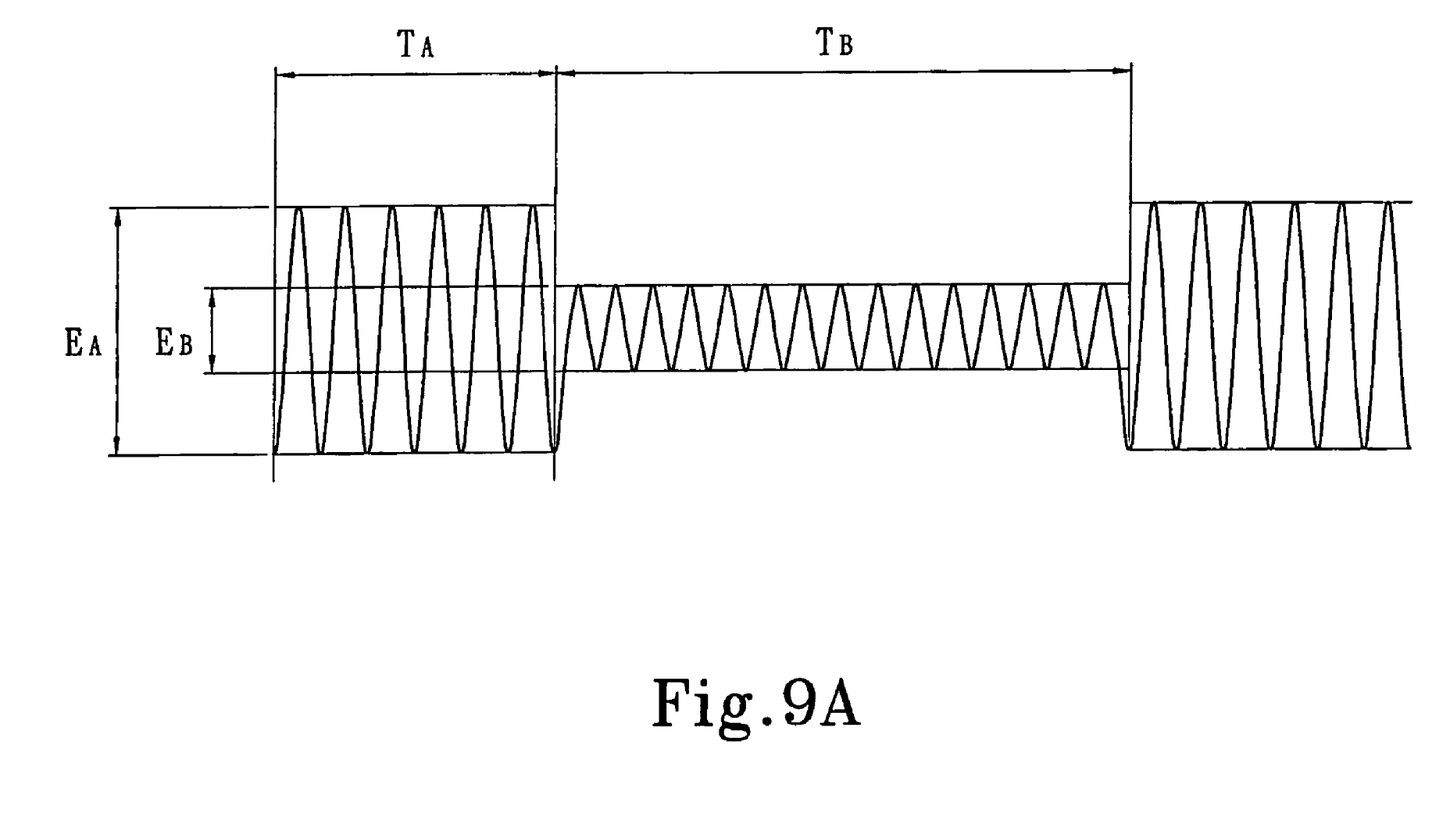
FIG. 9A is an illustrative view of a first combined waveform of a multi-period cycle alternative control period of the present invention.
Figure 9B:
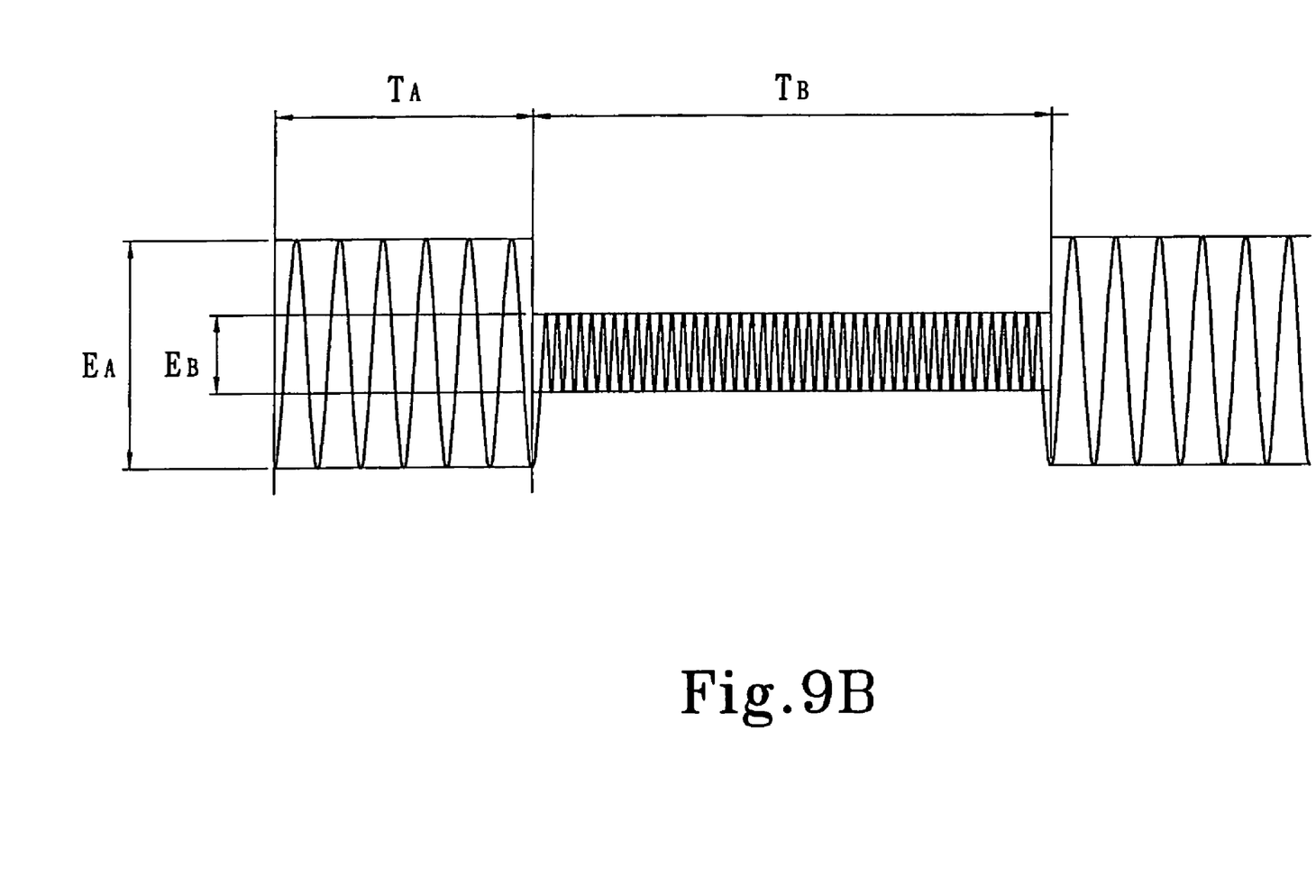
FIG. 9B is an illustrative view of a second combined waveform of a multi-period cycle alternative control period of the present invention.

The method of the present invention comprises the steps of inputting a total power control regulate signal (such as the signal regulated from 10% to 100%) from an input end of a burst timing control unit 3; using two or more mixed cycles to a produce a high reliability and a wide dynamic range by means of an OFF period (TB) of two ON_OFF burst periods after adding a regulation control power of a different amplitude; and then producing an ON_OFF (HIGH_LOW) control timing C1 by the burst timing control unit 3. The control timing C1 comprises an ON period (TA) and an OFF period (TB) as shown in FIG. 9; wherein the power strength (EA) of the ON period (TA) is determined by the power transfer control 1 and the power strength (EB) of the OFF period (TB) is determined by the dimming bias control 2, and the power strength (EA) is larger than the power strength (EB).

If it is necessary to change the power output of a power control device, a fixed frequency and a regulated duty width are adopted for a preferred embodiment of the invention. In other words, the frequencies of the ON period (TA) and the OFF period (TB) remain constant as shown in FIG. 9A, while the duty widths are changed.

Since the frequency is constant, therefore the bandpass filter power transfer component still can operate at the most efficient point (generally referred to a better frequency range). As to the change of duty width, a soft switching component 9 as shown in FIG. 8 obtains a voltage waveform with smaller amplitude because the voltage at the loading end is changed to obtain the amplitude regulation control function. Similarly, the ON period (TA) and the OFF period (TB) can also adopt a fixed frequency and a fixed duty width (as shown in FIG. 9B) or adopt a fixed frequency and a regulated duty width.

Further, a dimming control period unit can be added, so that when the strength is regulated, the ON period (TA) is kept constant, and the duty width is used to control the frequency and duty width of the unit, but the OFF period (TB) is controlled by the strength control unit for adding the average power of the ON period (TA) and the OFF period (TB) to the regulation input end in order to regulate the duty width of another cycle when the OFF period (TB) is regulated. Such duty width is substantially smaller than that of the ON period (TA), but the average is still large enough for achieving the strength control effect without any intermittence.

Since the present invention still maintains the power strength (EB) by the OFF period (TB), therefore the invention provides a standby mode function to greatly improve the amplitude regulation of the existing system and keeps the overall operation of the power transfer component not completely stopped. Therefore, the audible noise can be suppressed, and the ON period and OFF period respectively provide different power transfers to effectively excite the loading end and control the system performance, power transfer component and loading end device as to give better product reliability and efficiency.

The method in accordance with the invention comprises the steps of adding a regulated power EB with a different amplitude (as shown in FIGS. 9A and 9B) between two total burst periods of a amplitude regulated control waveform for improving the noise issue when the power transfer components are operating. In another preferred embodiment of the invention, the OFF period (TB) further includes a stop zone (TC) with power strength 0 (EC=0) for implementing a multi-period cycle-alternative combination to have equivalent effect as shown in FIG. 10.

Figure 10:
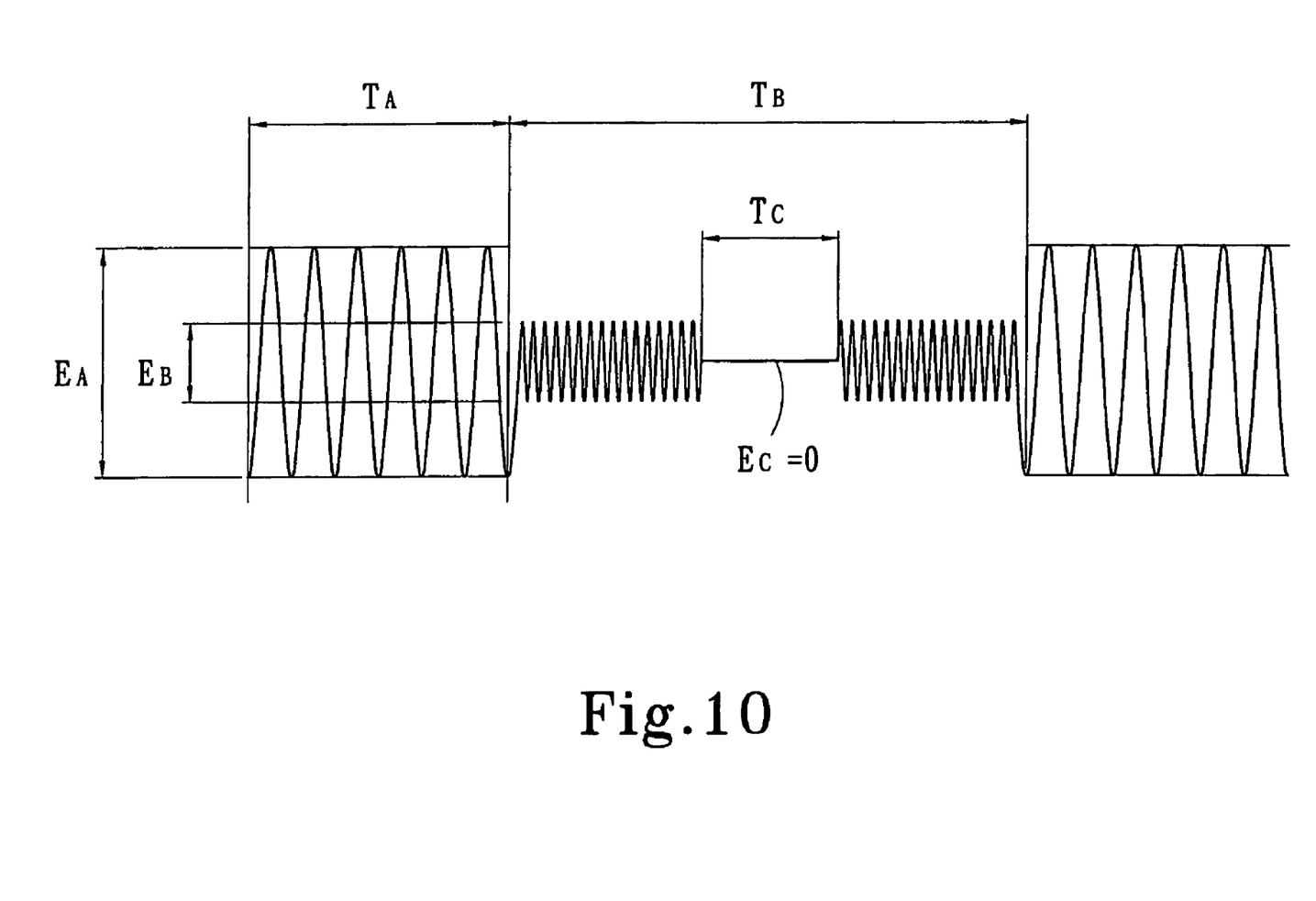
FIGS. 10 to 13 are views of some combined waveforms of a multi-period cycle alternative control period of the present invention.
Figure 13:
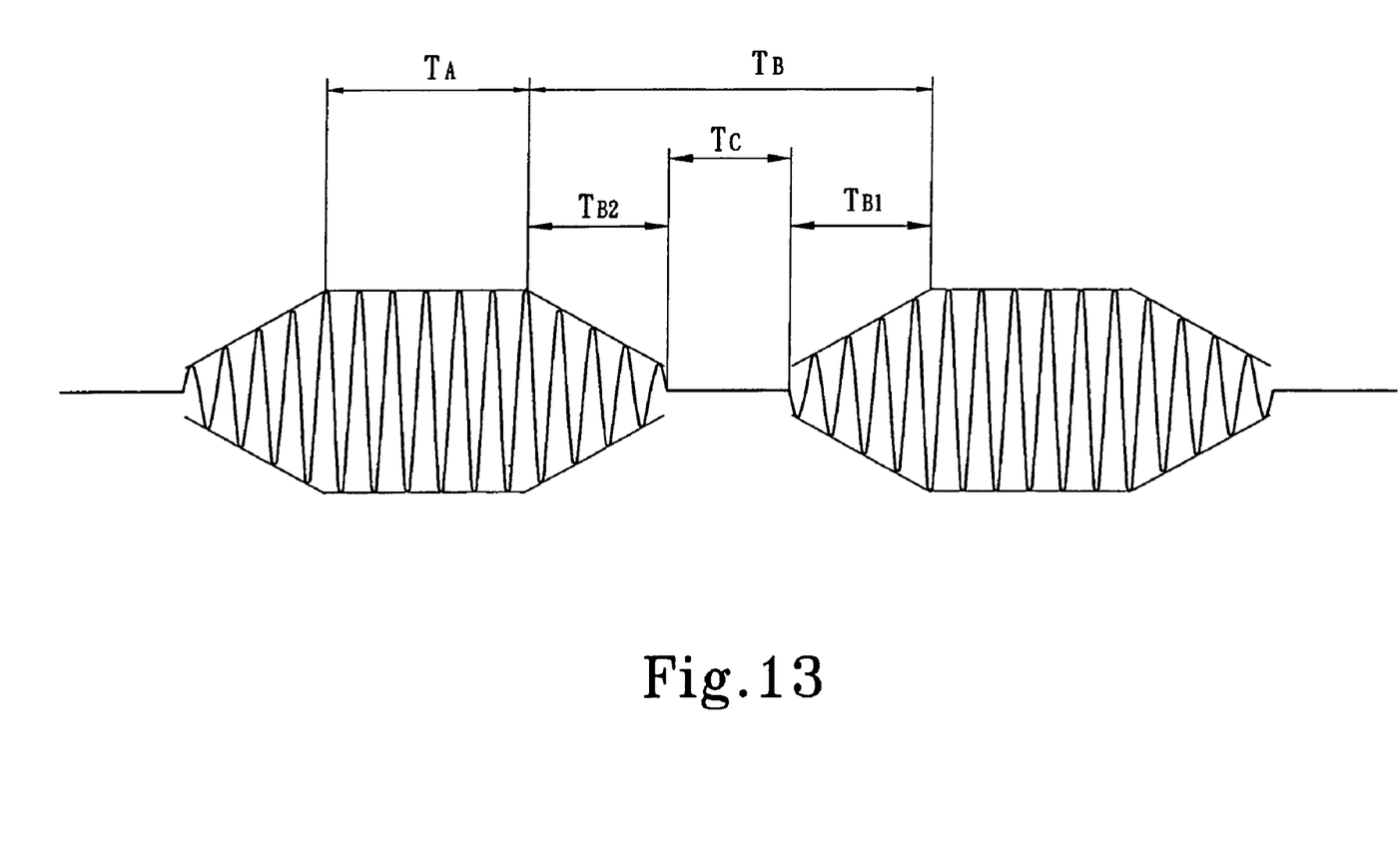

Further, FIG. 13 shows a multi-period cycle-alternative combination according to another preferred embodiment of the invention, which uses a slow dropping zone (TB2) and a slow rising zone (TB1) located in the OFF period (TB) in front of or behind the start and end zone (TC) as shown in FIG. 10 to improve the transition period of the power strength EA/EB and prevent an excessive rate of dynamically exciting the power strength EA/EB.

Figure 11:
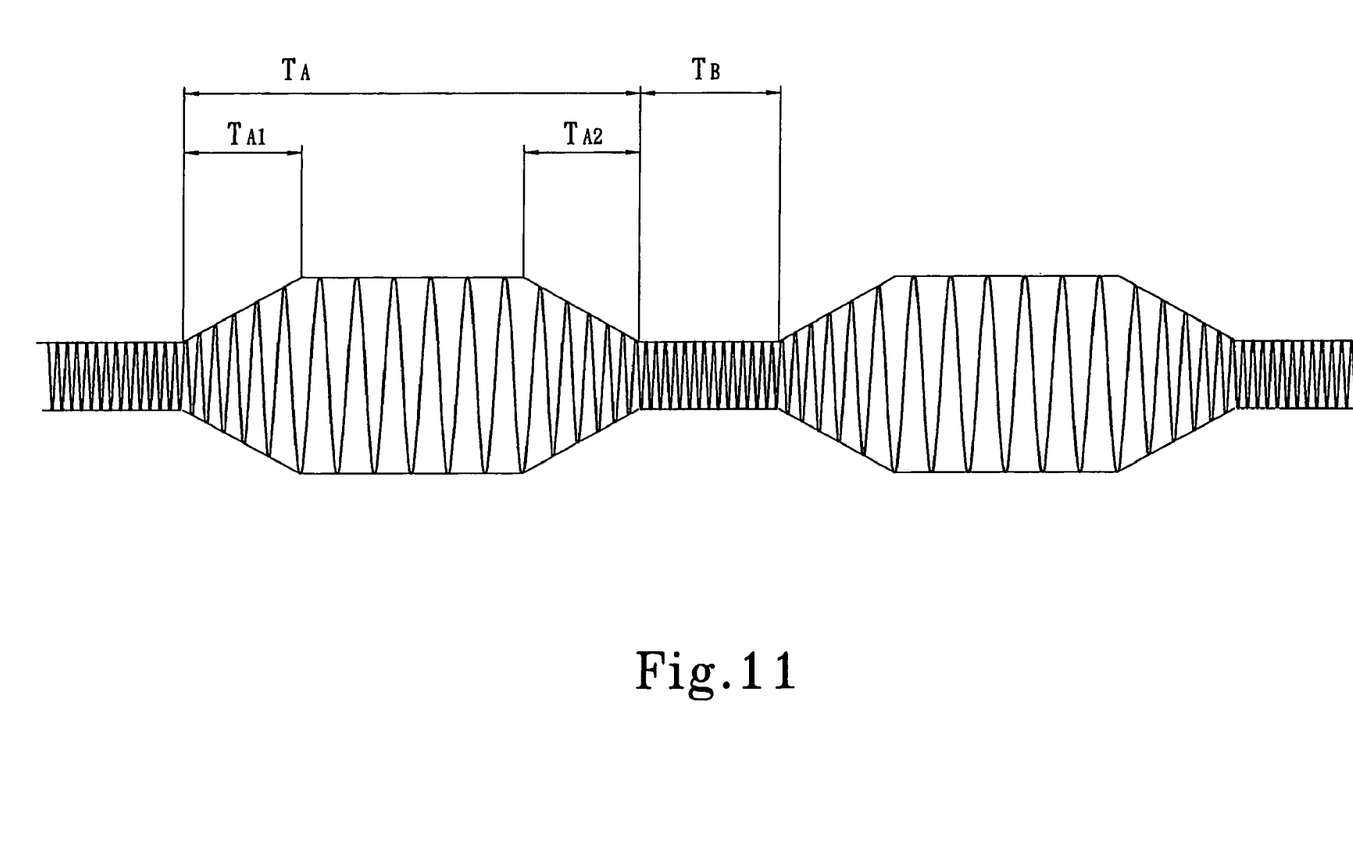
Figure 12:
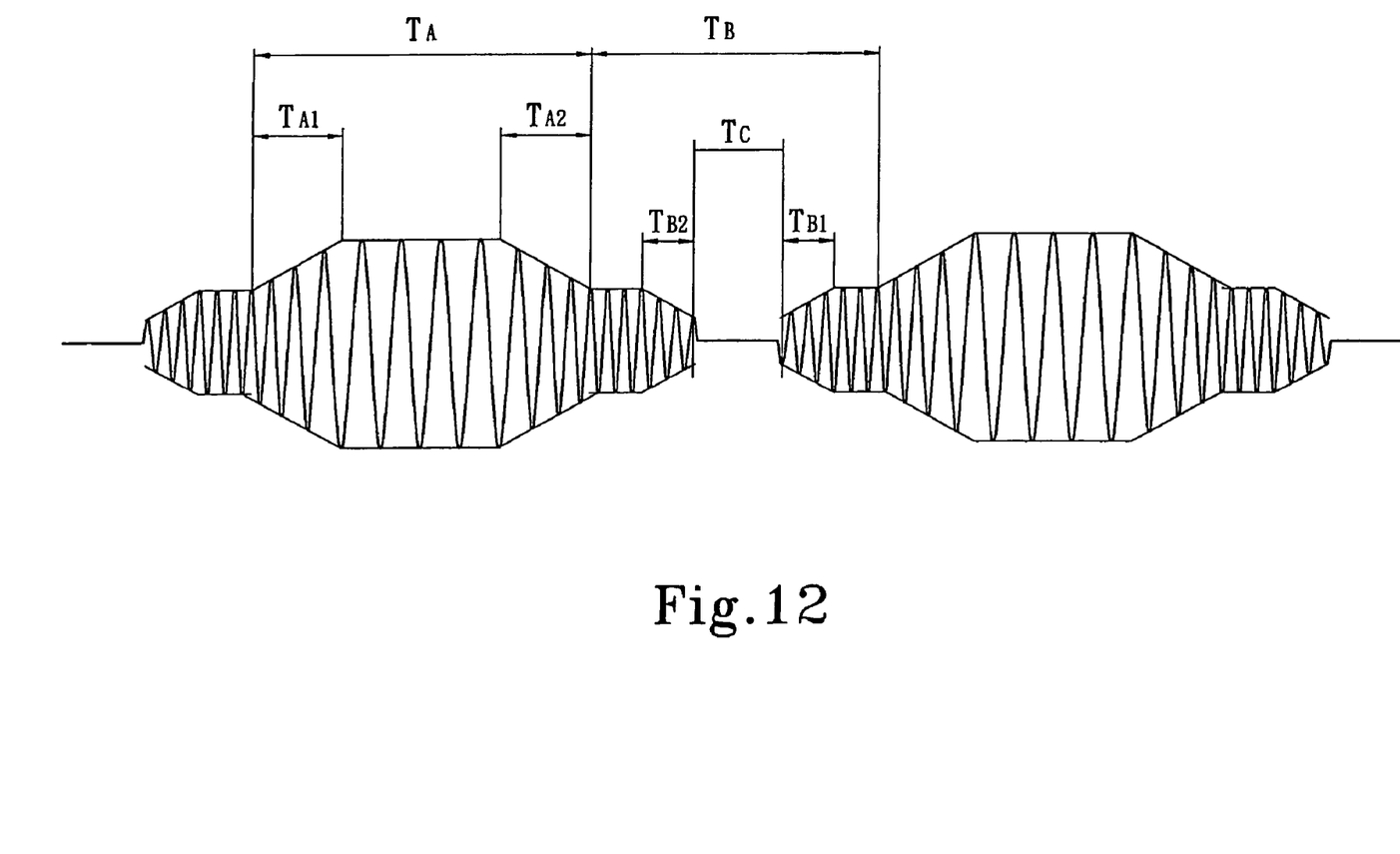

Please refer to FIG. 11 for a modification of the embodiment as depicted in FIG. 9A, which comprises a slow rising zone (TA1) and a slow dropping zone (TA2) located between the start and end zones of the ON period (TA) for improving the transition period of the power strength EA/EB and prevent an excessively large rate of dynamically exciting the power strength EA/EB. Similarly, the control waveform as shown in FIG. 10 bases on the start and end zones of the ON period (TA) and the OFF period (TB) to respectively provide slow rising zones (TA1, TB1) and slow dropping zones (TA2, TB2). These slow rising zones (TA1, TB1) and slow dropping zones (TA2, TB2) further comprise a buffer control circuit (such as a RC charge and discharge circuit) for the implementation.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-period cycle-alternative switching mode power supply control device, having a variable multi-period control cycle to effectively control certain power transfer components of specific nature and assure such component and the loading at its rear end can operate more efficiently in a reliable range of specific nature, said device comprising:
   a power transfer control, having an input terminal, and said input terminal inputting an error signal, and using the feedback error signal to regulate a duty width and obtain a regulated signal at the output terminal;
   a dimming bias control, having one input terminal coupled to an output terminal of said power transfer control, and using a clock signal generated by said power transfer control as a reference source, while using another input end of said dimming bias control to input an electric potential of an error signal and change the timing relation of the clock signal, and obtaining a set of control timing of a standby mode;
   a burst timing control, having an input terminal, and said input terminal having a dimming control input signal for comparing with a waveform signal generated by said burst timing control, and obtaining an ON_OFF control timing for selectively selecting a regulated signal outputted by said power transfer component and selecting the control timing of said dimming bias control, and being outputted from an output end of a steering logic control; and
   a steering logic control, sending a regulated signal outputted from said power transfer control, a control timing outputted from said dimming bias control, and a timing outputted by said burst timing control in sequence to an ON_OFF signal at an output terminal of said burst timing control and being separated in different timing according to the sequence, and thus controlling an external component and then sending to a component at a loading terminal after being processed through said external component to control the action of the component at the loading terminal.

2. The multi-period cycle-alternative switching mode power supply control device of claim 1, wherein said power transfer control comprises a resistor and a capacitor mutually coupled to constitute a determinant element for setting the working frequency point.

3. The multi-period cycle-alternative switching mode power supply control device of claim 1, wherein said burst timing control is a set of rising trigonometric wave circuit.

4. The multi-period cycle-alternative switching mode power supply control device of claim 1, wherein said component at the loading terminal is a lamp.

5. The multi-period cycle-alternative switching mode power supply control device of claim 1, wherein said component at the loading terminal is a rectification circuit.

6. The multi-period cycle-alternative switching mode power supply control device of claim 1, wherein said external element comprises a soft resonant element and a transfer element.

7. The multi-period cycle-alternative switching mode power supply control device of claim 6, wherein said steering logic control outputs a signal to control the external soft resonant element for an appropriate power waveform transfer, and the power waveform is sent to said transfer element for transferring the signals and then to the element at the loading terminal.

8. The multi-period cycle-alternative switching mode power supply control device of claim 1, wherein said power transfer control having a property of bandpass filter works at the most efficient point, and obtains a voltage waveform of a smaller amplitude through said output soft switching component due to the change of duty width, and obtains a regulation control function due to the change of voltage at the loading terminal.

9. A method for controlling a multi-period cycle-alternative switching mode power supply control device, comprising the steps of:
   inputting a total power control regulate signal from an input end of a burst timing control unit; and
   using at least two mixed cycles to a produce total power amplitude regulation control method with a high reliability and a wide dynamic range by means of an OFF period (TB) of two ON_OFF burst periods after adding a regulation control power of a different amplitude as to effectively control a power transfer component and assure the negative load of said power transfer component operating effectively in a specific reliable range.

10. The method for controlling a multi-period cycle-alternative switching mode power supply control device of claim 9, wherein said total power amplitude regulation control signal has a percentage within a specific width range, and said percentage ranges from 10% to 100%.

11. The method for controlling a multi-period cycle-alternative switching mode power supply control device of claim 9, wherein said control signal within said ON-OFF period adopts a fixed frequency and a regulated duty width.

12. The method for controlling a multi-period cycle-alternative switching mode power supply control device of claim 9, wherein said control signal within said ON-OFF period adopts a regulated frequency and a fixed duty width.

13. The method for controlling a multi-period cycle-alternative switching mode power supply control device of claim 9, wherein said control signal within said ON-OFF period adopts a regulated frequency and a regulated duty width.

14. The method for controlling a multi-period cycle-alternative switching mode power supply control device of claim 9, wherein said OFF period (TB) further comprises a stop zone (TC) with a zero power strength.

15. The method for controlling a multi-period cycle-alternative switching mode power supply control device of claim 14, wherein said OFF period further comprises a slow rising zone and a slow dropping zone between a start zone and an end zone for improving the transition period of said power strength to prevent an excessively large burst rate of said power strength.

16. The method for controlling a multi-period cycle-alternative switching mode power supply control device of claim 9, wherein said OFF period further comprises a slow rising zone and a slow dropping zone between a start zone and an end zone for improving the transition period of a power strength EA/EB of said ON_OFF period to prevent an excessively large burst rate of said power strength EA/EB.

* * * * *